United States Patent Office 3,106,598
Patented Oct. 8, 1963

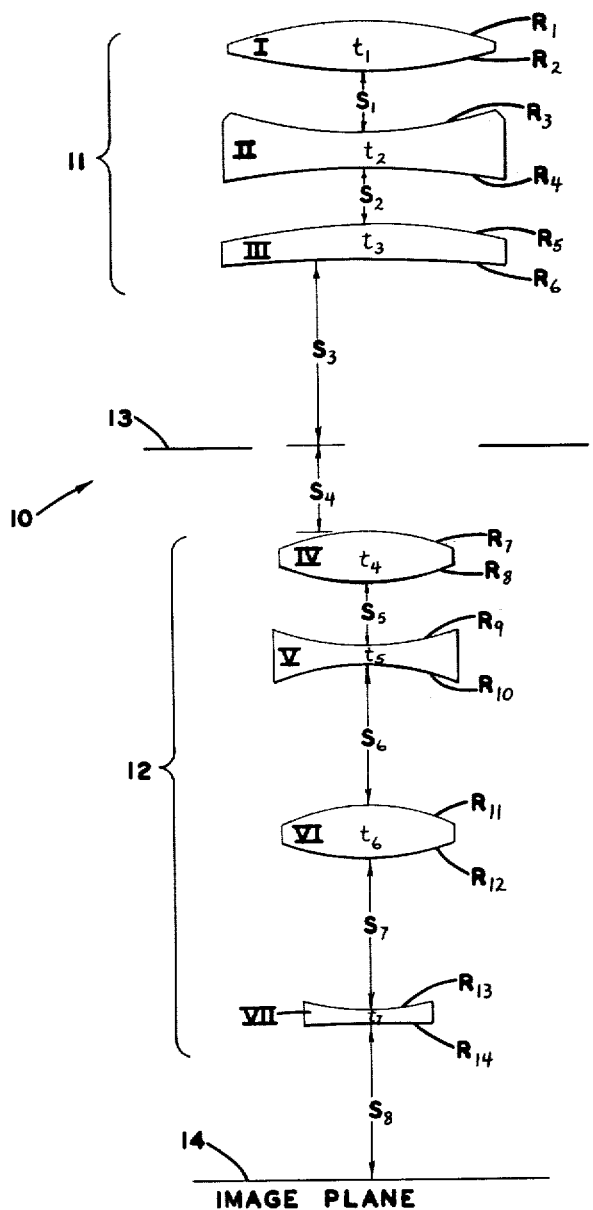

3,106,598
LONG FOCUS OPTICAL OBJECTIVE
Michael J. Buzawa, Rochester, N.Y., assignor to Bausch & Lomb Incorporated, Rochester, N.Y., a corporation of New York
Filed Nov. 8, 1961, Ser. No. 150,963
7 Claims. (Cl. 88—57)

The present invention relates to long focus optical objectives used principally in photography and more particularly it relates to such objectives having a large relative aperture and high resolution.

In objectives of the aforesaid kind, a problem of considerable magnitude is presented when the specifications thereof demand a long focus accompanied by high relative aperture and high resolution without degrading the image aberration-wise.

It is an object of this invention to provide a novel long focus objective principally for reflex cameras, said objective having a high relative aperture of at least $f/2.0$.

Another object is to provide such an objective having a flat field and excellent correction of the chromatic and monochromatic image aberration and furthermore having a high resolution which is as good as objectives which have one tenth of the focal length.

A further object is to provide an objective as above described which is comparatively simple in form and has a very excellent correction for zonal spherical aberration as well as secondary spectrum without the use of fluorite or similarly undesirable materials.

Further objects and advantages will be apparent in the arrangement and detailed construction and properties of the various parts of the invention by reference to the specification herebelow taken together with the accompanying drawing in which the single FIGURE therein illustrates the invention.

In the drawing, the objective is generally designated by the numeral 10 and includes a front lens group 11 and a rear lens group 12 in optical alignment therewith and having an intervening diaphragm 13 located between the groups.

According to this invention, the front lens group 11 comprises a negative lens II which is airspaced between a front positive lens I and rear positive lens III. The rear lens group 12 comprises a negative lens V which is similarly airspaced between a front positive lens IV and a rear positive lens VI and further comprises a negative field flattening lens VII rearwardly of lens VI.

Both lens groups have net positive power and the power of the rear lens group 12, excluding the negative lens VII for the purpose of comparison is substantially 2.0 times the power of the front lens group 11.

One of the unusual and advantageous features of this invention resides in the means used for correcting secondary color in the image in such a manner that sphero-chromatism is minimized. As partciularly pointed out hereinafter, it has been found by computation and experiment that said means involves the use of lens materials in the successive lens elements having respective partial dispersions which are not too far apart in value while the difference of Abbe number values related thereto is large. This combination of optical properties in said lens materials permits the use of low lens curvatures whereby sphero-chromatism is minimized and furthermore the number of lens elements required is reduced to a minimum.

The numerical values of the partial dispersions $$\left(P_{\mathrm{FD}}=\frac{N_\mathrm{F}-N_\mathrm{D}}{N_\mathrm{F}-N_\mathrm{C}}\right)$$

for the adjacent lenses I and II, also adjacent lenses IV and V, are respectively .700 and .709. It will be observed that while these values are not too far apart, the $\nu$ values are respectively 69.6 and 43.9 or a comparatively large difference of 25.7. The improvement factor in this regard may be stated as follows when $$p_1 = .709 - .700 = .009 \text{ and } \nu_1 = 69.6 - 43.9 = 25.7$$

$$\frac{p_1}{\nu_1} = \frac{.009}{25.7} = .00035$$

Considering the fact that in most optical systems $$\frac{p_1}{\nu_1} = \text{about } .00049$$

the aforesaid improvement factor stated percentagewise is about 29% relative to a similar objective composed of commonly used glasses.

Means are provided for flattening the field by using negative lens power, said means being the aforementioned field flattening lens VII which is spaced away from the image plane 14 by a distance $S_8$.

As stated hereabove, the objective 10 is designed to provide a large relative aperture of $f/2.0$ or more together with an abnormally long equivalent focal length. In such an optical system where the marginal ray must be deviated by substantially the same amount in both the front and rear lens groups, 11 and 12, the space between said groups must be great enough to reduce the image aberrations which results in the aforesaid relationship of the numerical powers of said lens groups.

All of the above mentioned conditions for achieving an excellent state of correction of image aberrations in an objective having very high resolving power may be satisfied when the lens members together with their successive intervening airspaces are constructed according to the following table of mathematical expressions wherein $F(I)$ to $F(VII)$ designate the focal lengths of the individual successive lens members numbering from the front, $S_1$ to $S_8$ designate the successive spaces surrounding said lens members and their associated diaphragm 13, and F designates the equivalent focus of said objective 10, $.88F < F(I) < 1.08F$
$.94F < -F(II) < 1.16F$
$1.94F < F(III) < 2.38F$
$.38F < F(IV) < .48F$
$.51F < -F(V) < .63F$
$1.02F < F(VI) < 1.26F$
$.55F < -F(VII) < .68F$
$.0021F < S_1 < .0027F$
$.026F < S_2 < .033F$
$.74F < S_3 < .92F$
$.15F < S_4 < .20F$
$.000088F < S_5 < .00011F$
$.115F < S_6 < .142F$
$.138F < S_7 < .170F$
$.08F < S_8 < .10F$ Stated in another manner, the constructional data for the lenses regarding the numerical values of the radii of the front and rear surfaces of the respective lenses may be specified in the following table of mathematical expressions wherein $R_1$ to $R_{14}$ denote the radii of the respective successive lens surfaces numbered from the front of the objective.

$1.135 < R_1/R_2 < 1.86$
$.22 < R_3/R_4 < .33$
$.238 < R_5/R_6 < .355$
$.40 < R_7/R_8 < .60$
$.75 < R_9/R_{10} < 1.14$
$.104 < R_{11}/R_{12} < .155$ $.28F < R_{13} < .35F$
$R_{14} > F$ said values being the ratios of absolute numbers.

In order to provide all of the above outlined superior qualities in the lens system of the objective 10, the numerical values of the constructional data therefor should lie within the ranges stated in the table of inequalities herebelow wherein $R_1$ to $R_{14}$ designate the successive lens surfaces, $t_1$ to $t_7$ designate lens thicknesses, $S_1$ to $S_8$ denote the successive airspaces in the system, and $n_D$ and $\nu$ designate the refractive index and Abbe number respectively of the materials from which certain lenses are made in the succeeding tables.

$1.26F < R_1 < 1.39F$
$.74F < -R_2 < .91F$
$.74F < -R_3 < .91F$
$2.76F < R_4 < 3.37F$
$.71F < R_5 < .88F$
$2.47F < R_6 < 3.03F$
$.29F < R_7 < .36F$
$.60F < -R_8 < .73F$
$.60F < -R_9 < .73F$
$.64F < R_{10} < .79F$
$.60F < R_{11} < .73F$
$4.70F < -R_{12} < 5.75F$
$.28F < -R_{13} < .35F$
$R_{14} > F$ wherein the minus (−) sign used with the R symbols designates those lens surfaces which have their centers of curvature located on the long conjugate side of said surfaces.

$.071F < t_1 < .087F$
$.04F < t_2 < .05F$
$.051F < t_3 < .063F$
$.046F < t_4 < .056F$
$.0248F < t_5 < .0303F$
$.0284F < t_6 < .0348F$
$.0124F < t_7 < .0152F$
$.0021F < S_1 < .0027F$
$.026F < S_2 < .032F$
$.74F < S_3 < .92F$
$.15F < S_4 < .20F$
$.000088F < S_5 < .00011F$
$.115F < S_6 < .142F$
$.138F < S_7 < .170F$
$.08F < S_8 < .10F$

The design of the above described optical system is so conceived as to permit certain manufacturing economies which may be effected without in any way sacrificing any of the above described fine performance qualities. The constructional data affected by said economies is specified by the following mathematical expressions, $R_9 = R_3 = R_{11}$
$n_D(I) = n_D(III) = n_D(IV) = n_D(VI)$
$\nu(I) = \nu(III) = \nu(IV) = \nu(VI)$
$n_D(II) = n_D(V)$
$\nu(II) = \nu(V)$
$1.515 < n_D(VII) < 1.519$
$62.0 < \nu(VII) < 67.0$ Preferred values for the constructional data related to one specific form of this invention are given in the table of equations herebelow wherein the symbols used have the same meaning as defined in the foregoing description.

$F(I) = .98F$
$-F(II) = 1.05F$
$F(III) = 2.16F$
$F(IV) = .43F$
$-F(V) = .57F$
$F(VI) = 1.14F$
$-F(VII) = .616F$ $R_1 = 1.265F$
$-R_2 = .828F$
$-R_3 = .825F$
$R_4 = 3.065F$
$R_5 = .80F$
$R_6 = 2.74F$
$R_7 = .323F$
$-R_8 = .666F$
$-R_9 = .666F$
$R_{10} = .714F$
$R_{11} = .666F$
$-R_{12} = 5.24F$
$-R_{13} = .318F$
$R_{14} = \infty$
$t_1 = .0789F$
$t_2 = .0456F$
$t_3 = .057F$
$t_4 = .0512F$
$t_5 = .0276F$
$t_6 = .0315F$
$t_7 = .0138F$
$S_1 = .00242F$
$S_2 = .0296F$
$S_3 = .829F$
$S_4 = .176F$
$S_5 = .0000985F$
$S_6 = .1278F$
$S_7 = .1543F$
$S_8 = .09F$
$n_D(I) = 1.5172$
$n_D(II) = 1.6132$
$n_D(III) = 1.5172$
$n_D(IV) = 1.5172$
$n_D(V) = 1.6132$
$n_D(VI) = 1.5172$
$n_D(VII) = 1.5170$
$\nu(I) = 69.6$
$\nu(II) = 43.9$
$\nu(III) = 69.6$
$\nu(IV) = 69.6$
$\nu(V) = 43.9$
$\nu(VI) = 69.6$
$\nu(VII) = 64.5$ From the foregoing description, it will be seen that an optical objective of large relative aperture of f/2.0 or more and a long equivalent focus is provided having an advantageous high resolution and these features are combined with an excellent state of correction for all image aberrations without recourse to materials such as fluorite which are expensive and difficult to work.

Although only one form of this invention has been shown and described in detail, other forms are possible and changes may be made in the details thereof without departing from the spirit of the invention as defined in the claims here appended.

I claim:

1. An optical objective of long focal length and high resolution having a relative aperture at least as large as f 2.0 comprising a front and a rear group of optically aligned lenses lying on opposite sides of an intervening diaphragm which cooperatively form an image, said front group including a double convex lens I, a double concave lens II and a meniscus lens III which is concave toward the rear, the successive axial spaces from the front toward the rear as far as the diaphragm being designated $S_1$, $S_2$, $S_3$, and the focal lengths of the lenses being designated F(I), F(II), F(III), said rear group including a double convex lens IV, a double concave lens V, a double convex lens VI, and a field flattening lens VII, the focal lengths thereof being designated respectively F(IV), F(V), F(VI) and F(VII) and the successive airspaces surrounding the lenses of the rear group between said diaphragm and image being $S_4$, $S_5$, $S_6$, $S_7$ and $S_8$, the positive power of said rear group without said field flattener being substantially 2.0 times the positive power of said front group, the values of said focal lengths and spacings being given in the table of mathematical statements herebelow wherein F represents the equivalent focal length of said objective, $$.88F < F(I) < 1.08F$$
$$.94F < -F(II) < 1.16F$$
$$1.94F < F(III) < 2.38F$$
$$.38F < F(IV) < .48F$$
$$.51F < -F(V) < .63F$$
$$1.02F < F(VI) < 1.26F$$
$$.55F < -F(VII) < .68F$$
$$.0021F < S_1 < .0027F$$
$$.026F < S_2 < .033F$$
$$.74F < S_3 < .92F$$
$$.15F < S_4 < .20F$$
$$.000088F < S_5 < .00011F$$
$$.115F < S_6 < .142F$$
$$.138F < S_7 < .170F$$
$$.08F < S_8 < .10F$$

2. An optical objective having a long focus and high resolution and a relative aperture at least as large as $f/2.0$ and composed of an optically aligned front and rear group of lenses, said groups having a diaphragm therebetween, each group having a negative lens interposed between two positive lenses, and said rear group including a negative field flattening lens in rearmost position, said lenses together forming a real image which is well corrected for chromatic and monochromatic aberrations, coma and astigmatism, the rear group exclusive of said field flattener having substantially 2.0 times the positive power of the front group, the focal length $F(I)$ to $F(VII)$ of the successive lenses numbering from the front of the objective, and the successive airspaces $S_1$ to $S_3$ occuring from the front lens to the diaphragm and the successive airspaces $S_4$ to $S_8$ from the diaphragm to said image being specified by the following table of mathematical expressions wherein F designates the equivalent focus of the entire objective.

$$.88F < F(I) < 1.08F$$
$$.94F < -F(II) < 1.16F$$
$$1.94F < F(III) < 2.38F$$
$$.38F < F(IV) < .48F$$
$$.51F < -F(VI) < .63F$$
$$1.02F < F(VI) < 1.26F$$
$$.55F < -F(VII) < .68F$$
$$.0021F < S_1 < .0027F$$
$$.026F < S_2 < .033F$$
$$.74F < S_3 < .927F$$
$$.15F < S_4 < .20F$$
$$.000088F < S_5 < .00011F$$
$$.115F < S_6 < .142F$$
$$.138F < S_7 < .170F$$
$$.08F < S_8 < .10F$$

the numerical value of the quotient which is obtained by dividing the difference between values of the partial dispersions of the positive and negative lenses by the difference between the $\nu$ values of said positive and negative lenses is not over substantially .00035.

3. An optical objective as set forth in claim 2 wherein the specific values of focal lengths and spacings for said lenses are substantially as stated in the table of equations herebelow, $$F(I) = .98F$$
$$-F(II) = 1.05F$$
$$F(III) = 2.16F$$
$$F(IV) = .43F$$
$$-F(V) = .57F$$
$$F(VI) = 1.14F$$
$$-F(VII) = .616F$$
$$S_1 = .0024F$$
$$S_2 = .030F$$
$$S_3 = .828F$$
$$S_4 = .176F$$
$$S_5 = .0000985F$$
$$S_6 = .128F$$
$$S_7 = .154F$$
$$S_8 = .090F$$

4. An optical objective having a focal length of at least 60 percent of its overall length and having a relative aperture as large as $f/2.0$, said objective being composed of two optically aligned groups of lenses spaced apart from each other and away from an interposed diaphragm, each group having a negative lens interposed between two positive lenses, and the rear group having a rearmost field flattening lens, said lenses together forming a real image which is well corrected for chromatic and monochromatic aberrations, coma and astigmatism, the rear group exclusive of said field flattening lens having substantially 2.0 times the positive power of the front group, the numerical value of the radii of the refractive surfaces of said lenses and the airspaces therebetween being stated in the following table of mathematical statements wherein $R_1$ to $R_{14}$ designate the successive refractive surfaces numbering from the front, $S_1$ to $S_8$ designate the successive airspaces, and F denotes the focal length of said objective, $$1.135 < R_1/R_2 < 1.86$$
$$.22 < R_3/R_4 < .33$$
$$.238 < R_5/R_6 < .355$$
$$.40 < R_7/R_8 < .60$$
$$.75 < R_9/R_{10} < 1.14$$
$$.104 < R_{11}/R_{12} < .155$$
$$.28F < R_{13} < .35F$$
$$R_{14} > F$$

said values of the ratios being absolute values $$.0021F < S_1 < .0027F$$
$$.026F < S_2 < .033F$$
$$.74F < S_3 < .91F$$
$$.15F < S_4 < .20F$$
$$.000088F < S_5 < .000110F$$
$$.115F < S_6 < .142F$$
$$.138F < S_7 < .170F$$
$$.08F < S_8 < .10F$$

the numerical value of the quotient which is obtained by dividing the difference between the values of the partial dispersions of the positive and negative lenses by the difference between the $\nu$ values of said positive and negative lenses is not over substantially .00035.

5. An optical objective having a focal length of at least 60 percent of its overall length and having a relative aperture as large as $f/2.0$, said objective being composed of two optically aligned groups of singlet lenses spaced apart from each other and away from an interposed diaphragm, each group having a negative lens interposed between two positive lenses, and the rear group having a rearmost field flattening lens and having substantially 2.0 times the positive power of the front group exclusive of the field flattening lens, the radii of the successive refractive surfaces $R_1$ to $R_{14}$ on said lenses I to VII respectively, the lens thicknesses thereof $t_1$ to $t_7$, the axial spaces therebetween $S_1$ to $S_8$, the refractive index $n_D$ and the Abbe number $\nu$ for the respective optical materials in said lenses being given in the following table of mathematical expressions wherein F designates the focal length of the objective, $$1.26F < R_1 < 1.39F$$
$$.74F < -R_2 < .91F$$
$$.74F < -R_3 < .91F$$
$$2.76F < R_4 < 3.37F$$
$$.71F < R_5 < .88F$$
$$2.47F < R_6 < 3.03F$$
$$.29F < R_7 < .36F$$
$$.60F < -R_8 < .73F$$
$$.60F < -R_9 < .73F$$

$.64F < R_{10} < .79F$
$.60F < R_{11} < .73F$
$4.70F < -R_{12} < 5.75F$
$.28F < -R_{13} < .35F$
$R_{14} > F$ wherein the minus (—) sign used with the R symbols designates those lens surfaces which have their centers of curvature located on the long conjugate side of said surfaces $.071F < t_1 < .087F$
$.04F < t_2 < .05F$
$.051F < t_3 < .063F$
$.046F < t_4 < .056F$
$.0248F < t_5 < .0303F$
$.0284F < t_6 < .0348F$
$.0124F < t_7 < .0152F$
$.0021F < S_1 < .0027F$
$.026F < S_2 < .033F$
$.74F < S_3 < .91F$ (lens III to diaphragm)
$.15F < S_4 < .20$ (diaphragm to lens IV)
$.000088F < S_5 < .00010F$
$.115F < S_6 < .142F$
$.138F < S_7 < .170F$
$.08F < S_8 < .10F$
$n_D(I) = n_D(III) = n_D(IV) = n_D(VI)$
$\nu(I) = \nu(III) = \nu(IV) = \nu(VI)$
$n_D(II) = n_D(V)$
$\nu(II) = \nu(V)$
$1.515 < n_D(VII) < 1.519$
$62.0 < \nu(VII) < 67.0$ the numerical value of the quotient which is obtained by dividing the difference between the values of the partial dispersions of the positive and negative lenses by the difference between the $\nu$ values of said positive and negative lenses is not over substantially .00035.

6. An optical objective as set forth in claim 5 further characterized by following relationship of lens surfaces, $R_9 = R_8 = R_{11}$, the positive lenses of each group having refractive indices which are substantially equal in value, and the corresponding $\nu$ values thereof being substantially equal to each other, whereby economy of manufacture is effected without sacrificing excellent optical performance of said objective.

7. An optical system having a long focus and large aperture of at least $f/2.0$ composed of a front and a rear group of singlet lenses separated from each other and from an intervening diaphragm and the rear group including a rearmost field flattening lens, each said group including a negative lens spaced between a pair of positive lenses, the specific constructional data therefor being substantially as given in the table of numerical values herebelow $R_1$ to $R_{14}$ designate the successive lens radii of the lenses I to VII numbering from the front of the system, $t_1$ to $t_7$ designate the lens thickness of said lenses and $S_1$ to $S_8$ denote the spaces therebetween, and $n_D$ and $\nu$ represent the refractive index and Abbe numbers respectively of the lens materials, the symbol F in the table designating the focal length of the entire system, $R_1 = 1.265F$
$-R_2 = .828F$
$-R_3 = .825F$
$R_4 = 3.065F$
$R_5 = .80F$
$R_6 = 2.74F$
$R_7 = .323F$
$-R_8 = .666F$
$-R_9 = .666F$
$R_{10} = .714F$
$R_{11} = .666F$
$-R_{12} = 5.24F$ wherein the minus (—) sign used with the R symbols designates those lens surfaces which have their centers of curvature located on the long conjugate side of said surfaces $t_1 = .0789F$
$t_2 = .0456F$
$t_3 = .057F$
$t_4 = .0512F$
$t_5 = .0276F$
$t_6 = .0315F$
$t_7 = .0138F$
$S_1 = .00242F$
$S_2 = .0296F$ (lens III to diaphragm)
$S_3 = .829F$
$S_4 = .176F$ (diaphragm to lens IV)
$-R_{13} = .318F$
$R_{14} = \infty$
$S_5 = .0000985F$
$S_6 = .1278F$
$S_7 = .1543F$
$S_8 = .09F$
$n_D(I) = 1.51722$
$n_D(II) = 1.61328$
$n_D(III) = 1.51722$
$n_D(IV) = 1.51722$
$n_D(V) = 1.61328$
$n_D(VI) = 1.51722$
$n_D(VII) = 1.51700$
$\nu(I) = 69.6$
$\nu(II) = 43.9$
$\nu(III) = 69.6$
$\nu(IV) = 69.6$
$\nu(V) = 43.9$
$\nu(VI) = 69.6$
$\nu(VII) = 64.5$ the numerical value of the quotient which is obtained by dividing the difference between the values of the partial dispersions of the positive and negative lenses by the difference between the $\nu$ values of said positive and negative lenses is not over substantially .00035.

No references cited.

UNITED STATES PATENT OFFICE

CERTIFICATE OF CORRECTION

Patent No. 3,106,598                      October 8, 1963

Michael J. Buzawa

It is hereby certified that error appears in the above numbered patent requiring correction and that the said Letters Patent should read as corrected below.

Column 5, line 50, for ".927F" read -- .92F --; column 7, line 56, for "thickness" read -- thicknesses --; column 8, lines 31 and 32, strike out $$-R_{13} = .318F$$
$$R_{14} = \infty$$

and insert the same after "$-R_{12}=5.24F$", in line 15, same column 8.

Signed and sealed this 21st day of April 1964.

(SEAL)
Attest:

ERNEST W. SWIDER
Attesting Officer

EDWARD J. BRENNER
Commissioner of Patents